(12) United States Patent
Prakash

(10) Patent No.: US 7,809,213 B2
(45) Date of Patent: *Oct. 5, 2010

(54) BLACK WHITE IMAGE COMPRESSION HAVING PRINT DENSITY CONTROL

(75) Inventor: Ravinder Prakash, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 37 days.

This patent is subject to a terminal disclaimer.

(21) Appl. No.: 12/268,556

(22) Filed: Nov. 11, 2008

(65) Prior Publication Data

US 2009/0067754 A1    Mar. 12, 2009

Related U.S. Application Data

(63) Continuation of application No. 10/771,003, filed on Feb. 3, 2004, now Pat. No. 7,515,758.

(51) Int. Cl.
*G06K 9/32* (2006.01)
*G06K 9/36* (2006.01)

(52) U.S. Cl. .................................. 382/298; 382/232

(58) Field of Classification Search . 358/426.1–426.16; 375/122; 382/100, 208, 227, 232, 233, 298
See application file for complete search history.

(56) References Cited

U.S. PATENT DOCUMENTS

| | | | |
|---|---|---|---|
| 3,976,982 A | 8/1976 | Eiselen | |
| 4,536,792 A | 8/1985 | Harshbarger | |
| 4,546,385 A | 10/1985 | Anastassiou | |
| 4,725,885 A * | 2/1988 | Gonzales et al. | 375/240.14 |
| 4,760,463 A | 7/1988 | Nonoyama et al. | |
| 4,811,239 A | 3/1989 | Tsao | |
| 4,924,522 A | 5/1990 | Bray et al. | |
| 5,029,107 A | 7/1991 | Lee | |
| 5,068,905 A * | 11/1991 | Hackett et al. | 382/299 |
| 5,109,438 A | 4/1992 | Alves et al. | |
| 5,282,057 A | 1/1994 | Mailloux et al. | |
| 5,293,254 A | 3/1994 | Eschbach | |
| 5,404,411 A | 4/1995 | Banton et al. | |

(Continued)

FOREIGN PATENT DOCUMENTS

EP    0295088 A2    12/1988

(Continued)

OTHER PUBLICATIONS

Kobayshi M. et al. "Information Retrieval on the Web," IBM Research, ACM Computing Surveys, vol. 32, Jun. 2000, pp. 144-173.

(Continued)

*Primary Examiner*—Samir A Ahmed
*Assistant Examiner*—Mehdi Rashidian
(74) *Attorney, Agent, or Firm*—Douglas Lashmit; Hoffman Warnick LLC

(57) ABSTRACT

A scaling system for compressing a bitonal image that has print density control. A system is disclosed that comprises: a pixel reduction system that generates a scaled image by reducing pixel pairs down to single scaled pixel based on a set of scaling rules; and a line density control system that allows the scaled image to be made lighter, normal or darker by changing the scaling rules.

31 Claims, 3 Drawing Sheets

U.S. PATENT DOCUMENTS

| | | | |
|---|---|---|---|
| 5,414,469 A * | 5/1995 | Gonzales et al. ....... | 375/240.18 |
| 5,504,588 A | 4/1996 | Takeuchi et al. | |
| 5,528,740 A | 6/1996 | Hill et al. | |
| 5,602,653 A | 2/1997 | Curry | |
| 5,700,611 A | 12/1997 | Regan et al. | |
| 5,717,839 A | 2/1998 | Ichikawa | |
| 5,757,982 A | 5/1998 | Tepmongkol | |
| 5,774,751 A | 6/1998 | Masuda et al. | |
| 5,867,632 A * | 2/1999 | Andree et al. ................. | 358/1.9 |
| 5,875,044 A | 2/1999 | Seto et al. | |
| 5,949,919 A | 9/1999 | Chen | |
| 5,974,200 A | 10/1999 | Zhou et al. | |
| 5,982,937 A | 11/1999 | Accad | |
| 6,088,489 A | 7/2000 | Miyake | |
| 6,185,328 B1 | 2/2001 | Shiau | |
| 6,384,895 B1 | 5/2002 | Sawano | |
| 6,404,919 B1 | 6/2002 | Nishigaki et al. | |
| 6,493,041 B1 | 12/2002 | Hanko et al. | |
| 6,606,418 B2 | 8/2003 | Mitchell et al. | |
| 6,608,915 B2 | 8/2003 | Tsujii | |
| 6,704,123 B1 | 3/2004 | Av-Shalom et al. | |
| 7,082,220 B2 | 7/2006 | Kondo et al. | |
| 7,197,157 B2 | 3/2007 | Akashi | |
| 7,224,486 B2 | 5/2007 | Shimizu | |
| 7,319,775 B2 | 1/2008 | Sharma et al. | |
| 7,515,758 B2 | 4/2009 | Prakash | |
| 2002/0005857 A1 | 1/2002 | Kasahara et al. | |
| 2005/0018873 A1 | 1/2005 | Rhoads | |
| 2005/0018917 A1 | 1/2005 | Brothers | |
| 2005/0069217 A1 | 3/2005 | Mukherjee | |
| 2005/0135700 A1 | 6/2005 | Anderson | |
| 2005/0169539 A1 | 8/2005 | Prakash | |
| 2007/0271182 A1 * | 11/2007 | Prakash et al. ................. | 705/45 |
| 2009/0067754 A1 | 3/2009 | Prakash | |

FOREIGN PATENT DOCUMENTS

| | | |
|---|---|---|
| EP | 0320755 A2 | 6/1989 |
| EP | 0539833 A2 | 5/1993 |
| EP | 0710034 A2 | 5/1996 |
| JP | 63090962 | 4/1988 |
| JP | 01147960 A | 9/1989 |
| JP | 06078136 | 3/1994 |
| JP | 10108007 | 4/1998 |
| JP | 11179983 A | 12/1998 |
| JP | 2002156662 A | 5/2002 |
| JP | 2002174831 A | 6/2002 |
| JP | 2002354233 | 12/2002 |
| JP | 2003241229 A | 8/2003 |
| WO | 9605692 A1 | 2/1996 |

OTHER PUBLICATIONS

Miller R.C. Jr., "Introduction to the IBM 3800 Printing Subsystem Models 3 and 8," IBM Journal of Research and Development, vol. 28, No. 3, May 1984, pp. 252-256. (Abstract Only).

Andreas E. Savakis, "Evaluation of Lossless Compression Methods for Gray Scale Document Images", IEEE, Copyright 2000, pp. 136-139.

Payson et al "Hardware Accelerators for Bitonal Image Processing", Digital Technical Journal, vol. 3, No. 4, Fall 1991, pp. 1-40.

Fernando et al, "A Unified Approach to Scene Change Detection in Uncompressed and Compressed Video", IEEE, Copyright 2000, pp. 350-351.

Goertzel et al., United States Defensive Publication No. T985,005, Dated Aug. 7, 1979, "Two-Dimensional Image Data Compression and Decompression System", pp. 1-24.

PTO, "Office Action", U.S. Appl. No. 10/706,584, Mail Date Aug. 24, 2007, 15 pages.

PTO, "Final Office Action", U.S. Appl. No. 10/706,584, Notification Date Feb. 22, 2008, 11 pages.

PTO, "Notice of Allowance and Fee(s) Due", U.S. Appl. No. 10/706,584, Date Mailed Jul. 10, 2008, 8 pages.

PTO, "Office Action", U.S. Appl. No. 101771,003, Notification Date Jan. 2, 2008, 16 pages.

PTO, "Notice of Allowance and Fee(s) Due", U.S. Appl. No. 10/771,003, Date Mailed Aug. 1, 2008, 53 pages.

PTO, "Office Action", U.S. Appl. No. 11/107,217, Mail Date Mar. 19, 2008, 130 pages.

PTO, "Final Office Action", U.S. Appl. No. 11/107,217, Mail Date Jul. 21, 2008, 21 pages.

PTO, "Office Action", U.S. Appl. No. 11/107,217, Notification Date Nov. 12, 2008, 24 pages.

PTO, "Office Action", U.S. Appl. No. 11/107,217, Notification Date Mar. 18, 2009, 24 pages.

PTO, "Final Office Action", U.S. Appl. No. 11/107,217, Notification Date Aug. 6, 2009, 23 pages.

PTO, "Office Action", U.S. Appl. No. 11/107,217, Notification Date Oct. 30, 2009, 23 pages.

PTO, "Office Action", U.S. Appl. No. 11/107,217, Notification Date Feb. 4, 2010, 18 pages.

PTO, "Notice of Allowance and Fee(s) Due", U.S. Appl. No. 11/107,217, Date Mailed Apr. 28, 2010, 8 pages.

* cited by examiner

| Index number | Input * | Output ** |
|---|---|---|
| 00 | 0 0 0 0 | 0 |
| 01 | 0 0 0 1 | 0 |
| 02 | 0 0 1 0 | 1 |
| 03 | 0 0 1 1 | 1 (set to 0 for darker output) |
| 04 | 0 1 0 0 | 1 |
| 05 | 0 1 0 1 | 1 (set to 0 for darker output) |
| 06 | 0 1 1 0 | 1 |
| 07 | 0 1 1 1 | 1 |
| 08 | 1 0 0 0 | 0 |
| 09 | 1 0 0 1 | 0 |
| 10 | 1 0 1 0 | 0 (set to 1 for lighter output) |
| 11 | 1 0 1 1 | 0 |
| 12 | 1 1 0 0 | 0 (set to 1 for lighter output) |
| 13 | 1 1 0 1 | 0 |
| 14 | 1 1 1 0 | 1 |
| 15 | 1 1 1 1 | 1 |

FIG. 2

BLACK WHITE IMAGE COMPRESSION HAVING PRINT DENSITY CONTROL

CONTINUATION APPLICATION

This continuation application claims priority to U.S. patent application Ser. No. 10/771,003 entitled BLACK WHITE IMAGE COMPRESSION HAVING PRINT DENSITY CONTROL, filed on Feb. 3, 2004, now U.S. Pat. No. 7,515,758, the contents of which are hereby incorporated by reference in their entirety.

CROSS REFERENCE TO RELATED APPLICATION

The present invention is related to co-pending U.S. patent application Ser. No. 10/706,584, filed on Nov. 12, 2003, entitled "System and Method for Providing Black White Image Compression," which is hereby incorporated by reference.

BACKGROUND OF THE INVENTION

1. Technical Field

The present invention relates generally to image compression, and more specifically relates to a black white image data compression system and method having print density control.

2. Related Art

Since the advent of the modem information technology age, systems have been developed to store, process, or communicate black white image data retrieved from printed documents. Common examples include, for instance, facsimile machines, copiers, scanners, etc. In many instances, the system is required to archive, store or transmit the black and white image data. To improve performance, the image data is compressed, thereby reducing storage, processing and bandwidth requirements.

Black white image data compression techniques are well known in the art. Due to the universal need for encoding and decoding (namely compression and decompression) of image data, the industry has adopted standards, which are widely used today. CCITT-G4, for example, is one of the most popular standards, finding its most extensive use in facsimile machines. Typical compression ratios using CCITT-G4 are on the order of 10-15×. Ultimately, the amount of compression is a function of the black white image information/data content.

In the case of most black white compression standards, such as CCITT-G4, the compression process, which is engineered to be an encoding process, is lossless, i.e., following the decompression process, all information present in the original image is fully recovered. Limitations exist with respect to the amount of compression that can be achieved.

Numerous present day industries are increasingly required to archive vast amounts of information in electronic form. Examples include the finance industry saving check images, the insurance industry saving documents, the health care industry saving medical records, the legal industry, federal and state governments, etc. Accordingly, in order to reduce storage costs, data compression for black white images remains of vital interest.

Often, it is not necessary for the compression to be completely lossless, i.e., some minor compression errors may be acceptable so long as the pertinent information contained on the document is not lost. For instance, imperfections on a compressed bank check image may be acceptable as long as legibility of the important information, e.g., name, amount, account, etc., is not impacted by the compression. An image compression system that could also enhance legibility of important information would be of great use for industries seeking black white image compression.

SUMMARY OF THE INVENTION

The present invention addresses the above-mentioned problems by providing a bitonal (e.g., black white) image compression system and method having print density control for enhancing legibility of information on a scaled image.

In a first aspect, the invention provides a scaling system for scaling a bitonal image, comprising: a pixel reduction system that generates a scaled image by reducing pixel pairs down to single scaled pixel based on a set of scaling rules; and a line density control system that allows the scaled image to be made lighter, normal or darker by changing the scaling rules.

In a second aspect, the invention provides a program product stored on a recordable medium for scaling a bitonal image, comprising: means for generating a scaled image by reducing pixel pairs down to single scaled pixel based on a set of scaling rules; and means for changing the scaling rules to make the scaled image lighter, normal or darker.

In a third aspect, the invention provides a method for scaling a bitonal image, comprising: selecting a line density setting of light, normal or dark; determining a set of scaling rules based on the selected line density setting; and generating a scaled image by reducing pixel pairs down to single scaled pixels based on the selected set of scaling rules.

BRIEF DESCRIPTION OF THE DRAWINGS

These and other features of this invention will be more readily understood from the following detailed description of the various aspects of the invention taken in conjunction with the accompanying drawings in which:

FIG. 2 depicts a pixel reduction table in accordance with the present invention.

DETAILED DESCRIPTION OF THE INVENTION

Figure 1:
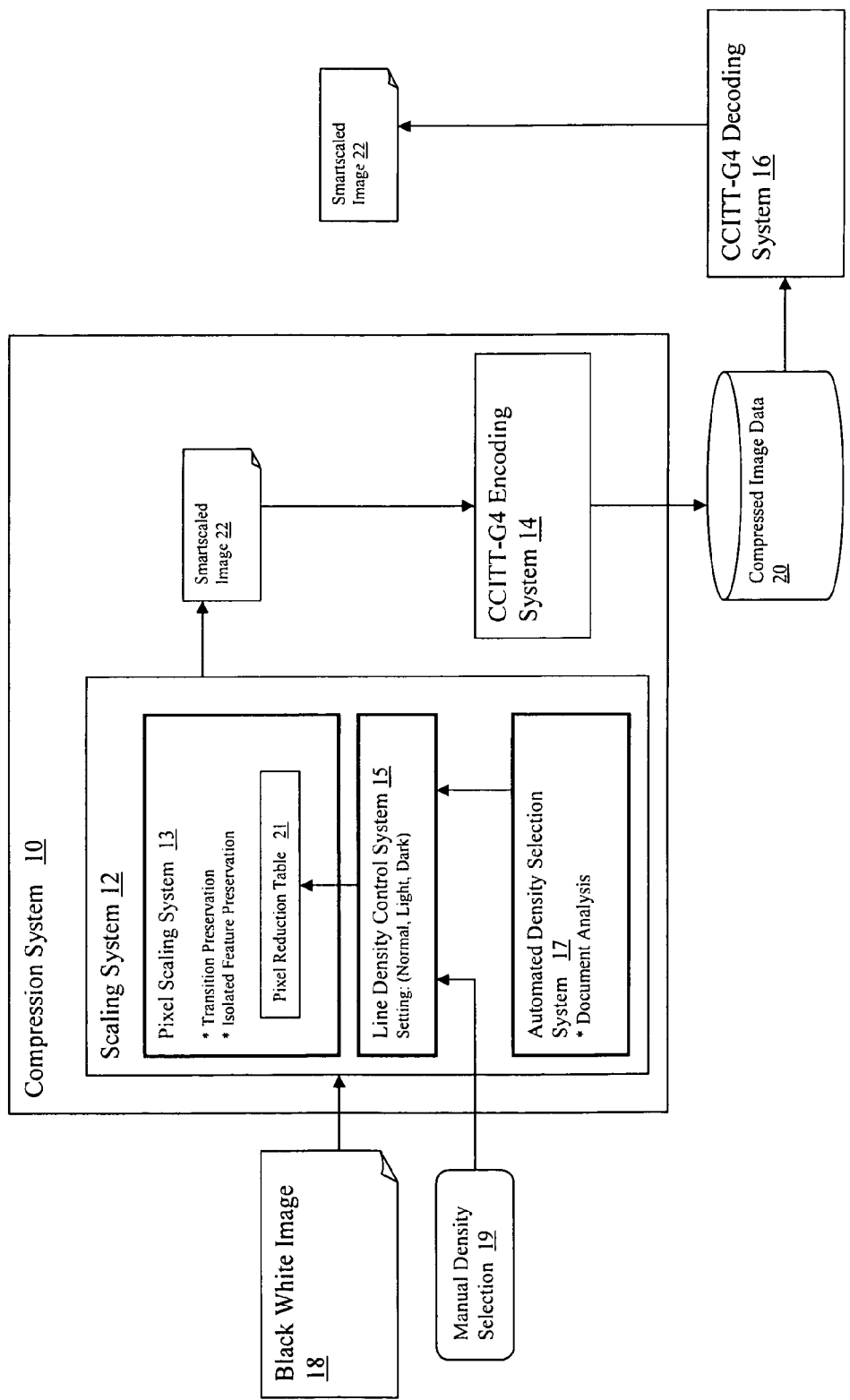
FIG. 1 depicts a bitonal compression system in accordance with the present invention.

The present invention provides a methodology for compressing images, beyond the capabilities of standardized encoding technologies, such as that provided by CCITT-G4. The compression technique described herein also provides a mechanism for providing print density control of lines or other printed data that appear on the image. Thus, lines or printed data can be made lighter, normal or darker to improve legibility of information.

While the embodiments described herein are described with reference to black white images, it should be recognized that the scope of the invention may be applied to any bitonal image. Moreover, while the invention is described with reference to a CCITT-G4 encoding system, it is understood that any known bitonal encoding technique could be utilized. Examples include ABIC, JBIG, etc.

The present invention recognizes that two attributes of a bitonal (e.g., black white) image are responsible for making the image legible and readable. The first important attribute involves transitions. As a black white image is scanned (similar in manner as a CRT scans a screen), one notices the presence of transitions, both from white to black and black to white. It is this aspect that gives the image contrast, readily noticed by the human eye. When properly placed transitions occur on multiple scan lines, legible and readable information begins to appear.

The second important attribute involves the very small (i.e., single) isolated features, namely, single black pixels between white pixels or single white pixels between black pixels.

These isolated features provide richness and sharpness to an image. As long as the scaling system is able to preserve these two attributes, and substantially maintain their relative geographic locations, a transformed image will offer near identical informational content.

Typical black white images (such as checks and other printed documents) have approximately 10% of their pixel space represented by black pixels. Since many of these black pixels will invariably be clustered together, a few transition points (relative to the entire pixel space) will be encountered when the image is scanned. Similarly, a typical black white image will also contain occasional isolated features. For example, there may be areas contained in the image where a single black pixel is sandwiched between white pixels, or where a single white pixel is sandwiched between black pixels.

A feature of the invention is to geometrically scale (referred to herein as "smartscaling") the image to reduce the pixel count while maintaining the two aforementioned attributes. In the exemplary embodiment described below, the pixel count is reduced by 2× in both the X and Y direction. However, it should be understood that any pixel reduction that maintains the two attributes could be utilized. Accordingly, smartscaling refers to any bitonal pixel reduction in which transition and isolated attributes are preserved, and the attributes' relative geographic positions are substantially maintained.

Referring now to FIG. 1, a compression system 10 is shown that receives a black white image 18 and outputs compressed image data 20, which can be, e.g., archived, transmitted, processed, etc. The black white image 18 is first submitted to scaling system 12, which includes a pixel reduction system 13, a line density control system 15, and optionally, an automated density selection system 17. Pixel reduction system 13 "smartscales" the image, resulting in a pixel reduction in which transition and isolated attributes are preserved, and the attributes' relative geographic positions are substantially maintained. Line density control system 15 provides a mechanism for selecting a light, normal or dark setting for the scaled image. Automated density selection system 17 provides a mechanism for automatically determining whether the image should be made lighter, normal or darker. The output of scaling system 12 is a smartscaled image 22, which is reduced in size from the original black white image 18, and which may have been made lighter or darker to improve legibility.

Pixel scaling system 13 generates a scaled image by reducing pixel pairs down to single scaled pixel based on a set of "scaling rules." As will be described in more detail below with reference to FIG. 2, the scaling rules may be incorporated into a pixel reduction table 21 that allows for a simple look-up procedure for scaling sets of contiguous pixels. Although this exemplary embodiment is implemented using a table, the scaling rules could be implemented in any fashion, e.g., as a "case" statement or a series of "if-then" statements in a software procedure, hardwired into an ASIC device, etc.

Line density control system 13 generally provides three density selection settings: light, normal or dark. Thus, if the printed features or data on the black white image 18 are too light, they can be made darker in the smartscaled image 22; if the printed features or data on the black white image 18 are acceptable, then the smartscaled image 22 can be generated with no density change; or if the printed features or data on the black white image 18 are too dark, they can be made lighter in the smartscaled image 22. As will be described below, line density control system 13 implements density settings by making minor changes to the scaling rules, e.g., as embodied in pixel reduction table 21.

Line density control system 15 can operate either as an automated process or as a manual process. For the manual process, the end user could make a manual density selection 19 of light, normal or dark, based on their preference. For automated processing, an automated density selection system 17 may be provided that automatically determines whether the image should be made lighter, normal or darker. The process of making an automated decision regarding line density can be done using any methodology. For instance, document features such as stroke width (pen thickness) or font size could be measured. Alternatively, either the local or global print density of the image could be measured. In any case, if the measured value fell below a first preset threshold indicating narrow lines, then automated density selection system 17 could set line density control system 15 to the dark setting. Alternatively, if the measured value was above a second preset threshold indicating broad lines, then automated density selection system 17 could set line density control system 15 to the light setting. Finally, if the measured value was between the first and second preset threshold indicating medium lines, then automated density selection system 17 could set line density control system 15 to the normal setting.

Moreover, the image could be fragmented by an image processing system, e.g., into text and graphics portions, such that different regions of the image could be made lighter, normal or darker based on local measurements. Accordingly, for the purposes of this disclosure, the term "image," may refer to a region of an image.

Although not required, other filtering and processing operations could also be applied to further improve the quality of the smartscaled image 22. The smartscaled image 22 is then submitted to a CCITT-G4 encoding system 14, which performs an industry standard encoding operation (commonly used in facsimile operations and the like). Note that other industry standard encoding system could likewise be used.

Once encoded, the smartscaled image 22 can be retrieved by decoding the compressed image data 20 with an industry standard CCITT-G4 decoding system 16. The scaled black white image can then be manipulated as needed (e.g., displaying, printing, zooming, expanding) using know techniques and systems with aliasing corrections.

Using the compression system 10 described above, a size reduction of about 45% can be achieved over the compression achieved by a stand-alone CCITT-G4 encoding system 14 working on an unscaled image. Note that a smartscaled image 22 may have limited, localized, geometric distortion. For instance, a single pixel may sometimes be displaced by one pixel position. However, this distortion is only evident when viewed under high magnification. Accordingly, for most all applications (such as E13B OCR readability), any distortion will not diminish or affect the information content being presented in the image.

As noted above, scaling system 12 provides a pixel reduction in which transition and isolated attributes are preserved, and the attributes' approximate relative geographic positions are substantially maintained.

In an exemplary embodiment, a 2× scaling reduction is achieved using scaling rules embodied in the pixel reduction table 21, which is shown in detail in FIG. 2. Specifically, pixel reduction table 21 provides a simple look-up tool for reducing two contiguous original pixel pairs down to a single scaled pixel. In order to achieve this, the table 21 dictates whether to assign the scaled pixel a value of 1 or 0 (1=white, 0=black). Table 21 achieves this by examining the two original pixels (i.e., pixel pair) and the two flanking pixels that neighbor the two original pixels.

In the table shown in FIG. 2, all possible combinations of four pixel values are shown in the input column and the index number is their decimal representation. It is the two central pixels of the input column that are replaced by the output. Output values are determined based on the four digit binary input value such that transition and isolated attributes are preserved in the scaled image, and the attributes' relative geographic positions are substantially maintained. For instance, it can be seen that "0010" has an isolated feature (i.e., a 1 sandwiched between zeros). Accordingly, this results in an output value of 1. The input "1100" has a transition from 1's to 0's. Accordingly, the output value is 0 to ensure that the transition is maintained. Each possible four-digit binary input value ranging from 0000-1111 therefore results in a unique one digit binary output, i.e., 0 or 1.

Note that the output values shown in the table are the default values for a normal setting. In order to effectuate a lighter or darker setting, the one-digit binary output values can be manipulated as shown in the parenthesis of the output column. Namely, if a darker output is desired, then the output values for 0011 and 0101 are changed from 1 to 0. Alternatively, if a lighter output is desired, then the output values for 1010 and 1100 are changed from 0 to 1. These values can be readily altered (e.g., with a software routine, using separate tables, etc.) as needed by line density control system 15 to change the line density settings.

The table depicted in FIG. 2 provides a 2× image reduction. Obviously, various alternative embodiments (e.g., examining a six digit binary input number, providing a 3× image reduction, etc.) could be implemented to achieve similar results. In a typical embodiment, the image may be first scaled in one direction, e.g., horizontally, and then be scaled in the other direction, e.g., vertically.

Figure 3:
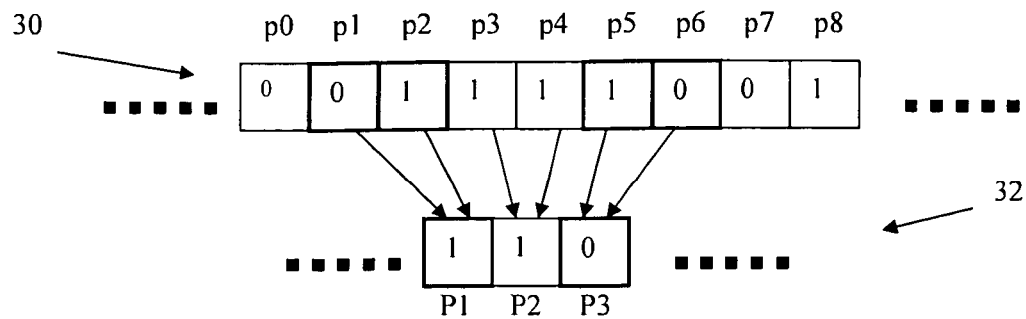
FIG. 3 depicts an exemplary smartscaling operation in which a normal line density setting is utilized in accordance with the present invention.
Figure 4:
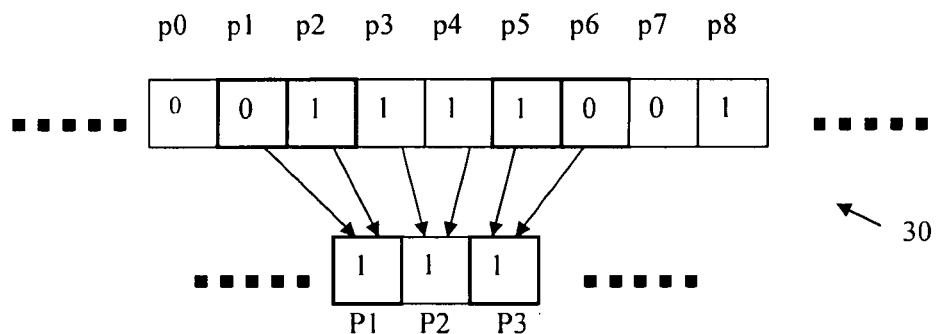
FIG. 4 depicts an exemplary smartscaling operation in which a light line density setting is utilized in accordance with the present invention.
Figure 5:
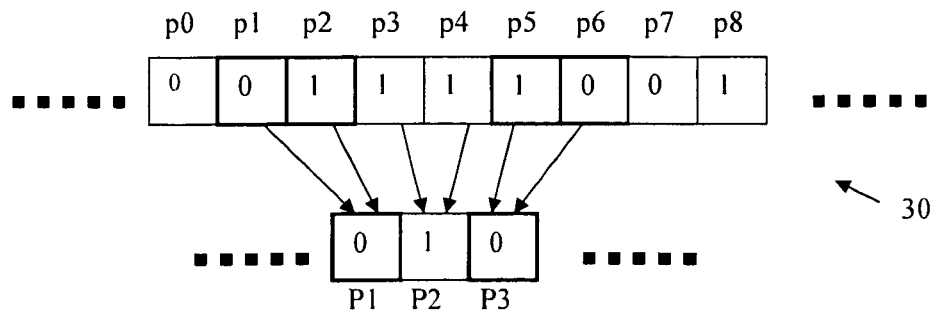
FIG. 5 depicts an exemplary smartscaling operation in which a dark line density setting is utilized in accordance with the present invention.

FIGS. 3-5 depict exemplary smartscaling results in which the number of pixels is reduced by a factor of two. FIG. 3 depicts results for a normal line density setting, FIG. 4 depicts results for a lighter line density setting, and FIG. 5 depicts results for a darker line density setting.

As depicted in FIG. 3, a first partial row 30 of pixels p0, p1 . . . p8 is shown prior to scaling, and a second partial row 32 of pixels P1, P2, P3, is shown after scaling. Each pixel of the black white (or any bitonal) image 18 has a value of either 1 or 0, where for example 1 represents white and 0 represents black. In this example, pixels p1-p6 are scaled down to P1-P3, i.e., contiguous sets of pixel pairs p1-p2, p3-p4, and p5-p6 are scaled to P1, P2, and P3, respectively.

Accordingly, when scaling pixels p1 and p2, the scaling rules examine pixel values for p0, p1, p2 and p3, in this case 0010. The four values provide the input into the table shown in FIG. 3. In this case, the input 0011 refers to index number 03, and yields an output value of 1. Accordingly, the scaled value for the original pixel pair p1, p2 is 1.

Similarly, the scaled value P2 for the original pixel pair p3, p4 is determined by examining the four values of pixels p2-p5 (i.e., 1111). In this case, the input 1111 refers to index number 15, and yields an output value of 1. The scaled value P3 for the original pixel pair p5, p6 is determined by examining the four values of pixels p4-p7 (i.e., 1100). In this case, the input 1100 refers to index number 12, and also yields an output value of 0.

FIG. 4 shows the results for smartscaling the same pixel set p0-p8 with a lighter line density setting. In this case, the first pixel reduction p1, p2→P1 does not change from that described above, since the input value 0011 is not affected by a change to the line density setting. Similarly, the second pixel reduction p3, p4→P2 does not change since the input value 1111 is not affected by a change to the line density setting. However, the third pixel reduction p5, p6→P3 is affected, since the result for input 1100 gets changed from a 0 to 1, relative to the normal setting, when the lighter setting is selected (see FIG. 2).

FIG. 5 shows the results for smartscaling the same pixel set p0-p8 with a darker line density setting. In this case, the first pixel reduction p1, p2→P1 is affected, since the result for input 0011 gets changed from a 1 to 0, relative to the normal setting, when the darker setting is selected (see FIG. 2). The remaining pixel reductions p3, p4→P2 and p5, p6→P3 are not affected by the darker selection.

Accordingly, it can be seen that effectuating a change from normal to lighter or darker, is a relatively simple process that can be readily integrated into the scaling rules.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

It is claimed:

1. A scaling system for scaling a bitonal image, comprising:
   at least one computing device;
   a pixel reduction system that generates a scaled image by reducing pixel pairs down to single scaled pixel based on a set of scaling rules,
   wherein the scaling rules are incorporated into a look-up table, wherein the scaling rules map an input comprised of four pixel values to an output comprised of one pixel value, wherein the four pixel values include two values of a pixel pair and two values of two pixels that flank the pixel pair; and provide for sixteen possible values for the input ranging from binary 0000 to 1111, and two possible values for the output comprising 0 and 1, and wherein the input values 0000, 0001, 0010, 0011, 0100, 0101, 0110, 0111, 1000, 1001, 1010, 1011, 1100, 1101, 1110 and 1111 map to outputs 0, 0, 1, 1, 1, 1, 1, 1, 0, 0, 0, 0, 0, 0, 1, 1, respectively for a normal setting; and
   a line density control system that allows the scaled image to be set to lighter, normal or darker by changing the scaling rules, wherein the line density control system sets the outputs associated with inputs 0011 and 0101 to 0 to achieve a darker image.

2. The scaling system of claim 1, wherein the line density control system sets the outputs associated with inputs 1010 and 1100 to 1 to achieve a lighter image.

3. The scaling system of claim 1, wherein the bitonal image comprises a black white image.

4. The scaling system of claim 1, wherein the scaling rules are optimized to preserve transition and isolated attributes, and substantially maintain relative geographic position of image attributes.

5. The scaling system of claim 1, further comprising an automated density selection system that automatically determines whether the scaled image should be made lighter, normal or darker.

6. The scaling system of claim 5, wherein the automated density selection system analyzes data selected from the group consisting of: stroke width, font size, and print density.

7. A computer readable medium storing a program product for scaling a bitonal image, which when executed by a computing device comprises:
   program code for generating a scaled image by reducing pixel pairs down to single scaled pixel based on a set of scaling rules,
   wherein the scaling rules are incorporated into a look-up table, wherein the scaling rules map an input comprised of four pixel values to an output comprised of one pixel value, wherein the four pixel values include two values of a pixel pair and two values of two pixels that flank the pixel pair; for a normal setting provide for sixteen possible values for the input ranging from binary 0000 to 1111, and two possible values for the output of 0 and 1, and wherein the input values 0000, 0001, 0010, 0011, 0100, 0101, 0110, 0111, 1000, 1001, 1010, 1011, 1100, 1101, 1110 and 1111 map to outputs 0, 0, 1, 1, 1, 1, 1, 1, 0, 0, 0, 0, 0, 0, 1, 1, respectively; and
   program code for changing the scaling rules to make the scaled image lighter, normal or darker wherein said program code for changing the scaling rules sets the outputs associated with inputs 0011 and 0101 to 0 to achieve a darker image.

8. The computer readable medium of claim 7, wherein said program code for changing the scaling rules sets the outputs associated with inputs 1010 and 1100 to 1 to achieve a lighter image.

9. The computer readable medium of claim 7, wherein the bitonal image comprises a black white image.

10. The computer readable medium of claim 7, further comprising program code for automatically determining whether the scaled image should be made lighter, normal or darker.

11. The computer readable medium of claim 10, wherein the determining program code analyzes data selected from the group consisting of: stroke width, font size and print density.

12. A scaling system for scaling a bitonal image, comprising:
   at least one computing device;
   a pixel reduction system that generates a scaled image by reducing pixel pairs down to single scaled pixel based on a set of scaling rules; and
   a line density control system that allows the scaled image to be set to lighter, normal or darker by changing the scaling rules, wherein the scaling rules map an input comprised of four pixel values to an output comprised of one pixel value, wherein the four pixel values include two values of a pixel pair and two values of two pixels that flank the pixel pair, wherein the scaling rules provide for sixteen possible values for the input ranging from binary 0000 to 1111, and two possible values for the output comprising 0 and 1, and wherein the input values 0000, 0001, 0010, 0011, 0100, 0101, 0110, 0111, 1000, 1001, 1010, 1011, 1100, 1101, 1110 and 1111 map to outputs 0, 0, 1, 1, 1, 1, 1, 1, 0, 0, 0, 0, 0, 0, 1, 1, respectively for a normal setting.

13. The scaling system of claim 12, wherein the scaling rules are incorporated into a look-up table.

14. The scaling system of claim 12, wherein the scaling rules are optimized to preserve transition and isolated attributes, and substantially maintain relative geographic position of image attributes.

15. The scaling system of claim 12, wherein the line density control system sets the outputs associated with inputs 0011 and 0101 to 0 to achieve a darker image.

16. The scaling system of claim 12, wherein the line density control system sets the outputs associated with inputs 1010 and 1100 to 1 to achieve a lighter image.

17. The scaling system of claim 12, wherein the bitonal image comprises a black white image.

18. The scaling system of claim 12, further comprising an automated density selection system that automatically determines whether the scaled image should be made lighter, normal or darker.

19. The scaling system of claim 18, wherein the automated density selection system analyzes data selected from the group consisting of: stroke width, font size, and print density.

20. A computer readable medium storing a program product for scaling a bitonal image, which when executed by a computing device comprises:
   program code for generating a scaled image by reducing pixel pairs down to single scaled pixel based on a set of scaling rules, wherein the scaling rules map an input comprised of four pixel values to an output comprised of one pixel value, wherein the four pixel values include two values of a pixel pair and two values of two pixels that flank the pixel pair, wherein the scaling rules provide for sixteen possible values for the input ranging from binary 0000 to 1111, and two possible values for the output comprising 0 and 1, and wherein the input values 0000, 0001, 0010, 0011, 0100, 0101, 0110, 0111, 1000, 1001, 1010, 1011, 1100, 1101, 1110 and 1111 map to outputs 0, 0, 1, 1, 1, 1, 1, 1, 0, 0, 0, 0, 0, 0, 1, 1, respectively for a normal setting; and program code for changing the scaling rules to make the scaled image lighter, normal or darker.

21. The computer readable medium of claim 20, wherein the scaling rules are incorporated into a look-up table.

22. The computer readable medium of claim 20, wherein said program code for changing the scaling rules sets the outputs associated with inputs 0011 and 0101 to 0 to achieve a darker image.

23. The computer readable medium of claim 20, wherein said program code for changing the scaling rules sets the outputs associated with inputs 1010 and 1100 to 1 to achieve a lighter image.

24. The computer readable medium of claim 20, wherein the bitonal image comprises a black white image.

25. The computer readable medium of claim 20, further comprising program code for automatically determining whether the scaled image should be made lighter, normal or darker.

26. The computer readable medium of claim 25, wherein the determining program code analyzes data selected from the group consisting of: stroke width, font size and print density.

27. A method for scaling a bitonal image on a computing device, comprising:

selecting a line density setting, wherein the scaling rules map an input comprised of four pixel values to an output comprised of one pixel value, wherein the four pixel values include two values of a pixel pair and two values of two pixels that flank the pixel pair, wherein the scaling rules for a normal setting provide for sixteen possible values for the input ranging from binary 0000 to 1111, and two possible values for the output comprising 0 and 1, and wherein the input values 0000, 0001, 0010, 0011, 0100, 0101, 0110, 0111, 1000, 1001, 1010, 1011, 1100, 1101, 1110 and 1111 map to outputs 0, 0, 1, 1, 1, 1, 1, 1, 0, 0, 0, 0, 0, 0, 1, 1, respectively:

determining a set of scaling rules based on the selected line density setting; and generating a scaled image by reducing pixel pairs down to single scaled pixels based on a set of scaling rules.

28. The method of claim 27, wherein the step of selecting a line density setting is done automatically by analyzing data on the bitonal image, wherein the data is selected from the group consisting of: stroke width, font size, and print density.

29. The method of claim 27, wherein the line density setting is selected from the group consisting of: light, normal and dark.

30. The method of claim 27, wherein the scaling rules set the outputs associated with inputs 0011 and 0101 to 0 to achieve a darker image.

31. The method of claim 27, wherein the scaling rules set the outputs associated with inputs 1010 and 1100 to 1 to achieve a lighter image.

* * * * *